United States Patent [19]
Iwasaki

[11] Patent Number: 5,838,797
[45] Date of Patent: Nov. 17, 1998

[54] SECURE COMMUNICATION BY ENCRYPTION/DECRYPTION OF VECTOR AT PSK MODULATION/DETECTION STAGE

[75] Inventor: Motoya Iwasaki, Tokyo, Japan

[73] Assignee: NEC Corporation, Tokyo, Japan

[21] Appl. No.: 576,968

[22] Filed: Dec. 26, 1995

[30] Foreign Application Priority Data

Dec. 26, 1994 [JP] Japan .................................. 6-322642

[51] Int. Cl.$^6$ .................................................. H04L 27/18
[52] U.S. Cl. ................................ 380/49; 380/12; 380/46; 380/48; 375/280; 375/308; 375/331
[58] Field of Search ................................ 380/49, 48, 31, 380/12, 46; 375/280, 308, 331

[56] References Cited

U.S. PATENT DOCUMENTS 3,748,385  7/1973  Okano ................................ 380/280
4,652,838  3/1987  Nossen ................................ 380/6
4,924,516  5/1990  Bremer et al. .......................... 380/46

*Primary Examiner*—Gilberto Barron, Jr.
*Attorney, Agent, or Firm*—Sughrue, Mion, Zinn, Macpeak & Seas, PLLC

[57] ABSTRACT

At the transmit end of a secure communication system, an input data symbol is mapped to a corresponding vector in a two-dimensional phase plane. The vector is pseudorandomly phase-rotated in a first direction according to a unique pseudorandom number and quadrature-modulated on a carrier for transmission. At the receive end, a quadrature detector quasi-synchronously quadrature-detects the transmitted carrier with a local carrier to recover a vector, which is pseudorandomly phase-rotated according to a pseudorandom number identical to the unique pseudorandom number in a second direction opposite to the first direction. A quadrature demodulator detects a phase error of the local carrier with respect to the received carrier and provides quadrature-demodulation on the oppositely phase-rotated vector using the detected phase error.

4 Claims, 3 Drawing Sheets

SECURE COMMUNICATION BY ENCRYPTION/DECRYPTION OF VECTOR AT PSK MODULATION/DETECTION STAGE

BACKGROUND OF THE INVENTION

1. Field of the Invention

The present invention relates generally to secure communication systems, and more particularly to such a communication system using phase shift keying (PSK) modulation and demodulation.

2. Description of the Related Art

In a conventional secure communication system, information-bearing analog signal is converted at the transmit end of the system to a digital signal which is then encrypted, or scrambled with pseudorandom codes and applied to an analog modulator where the encrypted signal is modulated onto a carrier for transmission. At the receive end, the transmitted carrier is demodulated, recovering the baseband signal, which is then combined with pseudorandom codes to produce a deciphered signal for conversion to analog form. The deciphering codes are identical to the ciphering codes to obtain a replica of the original signal.

In the conventional systems, the modulation circuit only functions as an interface to transmission medium and the type of modulation can be easily detected by unauthorized users. If the modulation type of a system is known, a received signal can be demodulated into the original baseband signal, which is then laid open to unauthorized access for decryption. Since various deciphering algorithms have been developed so far, encryption algorithms are vulnerable to unauthorized attempts. Thus, even if a powerful encryption algorithm is used, it is still exposed to the danger of being deciphered once the encrypted baseband signal is recovered.

SUMMARY OF THE INVENTION

It is therefore an object of the present invention to provide a secure communication system and method which is less vulnerable to deciphering attempts than conventional ciphering techniques.

The object of the present invention is obtained by pseudorandomly rotating the vector of a phase-shift keyed signal at a transmitter and pseudorandomly rotating a demodulated vector at a receiver in a direction opposite to the direction of rotation at the transmitter.

According to the present invention, there is provided a secure communication system comprising a mapping circuit for mapping an input symbol to a corresponding one of a predetermined number of vectors in a two-dimensional phase plane. A first phase rotation circuit pseudorandomly phase-rotates the output vector of the mapping circuit in a first direction according to a unique pseudorandom number. A quadrature modulator performs quadrature-modulation on a transmit carrier with the output vector of the first phase rotation circuit for transmission. A quadrature detector receives the quadrature-modulated carrier and quasi-synchronously quadrature-detects the received carrier with a local carrier. A second phase rotation circuit is provided for pseudorandomly phase-rotating the output vector of the quadrature detector according to a pseudorandom number identical to the unique pseudorandom number in a second direction opposite to the first direction. A quadrature demodulator detects a phase error of the local carrier with respect to the received carrier and quadrature-demodulates the output vector of the second phase rotation circuit with the detected phase error.

BRIEF DESCRIPTION OF THE DRAWINGS

The present invention will be described in further detail with reference to the accompanying drawings, in which.

DETAILED DESCRIPTION

Figure 1:
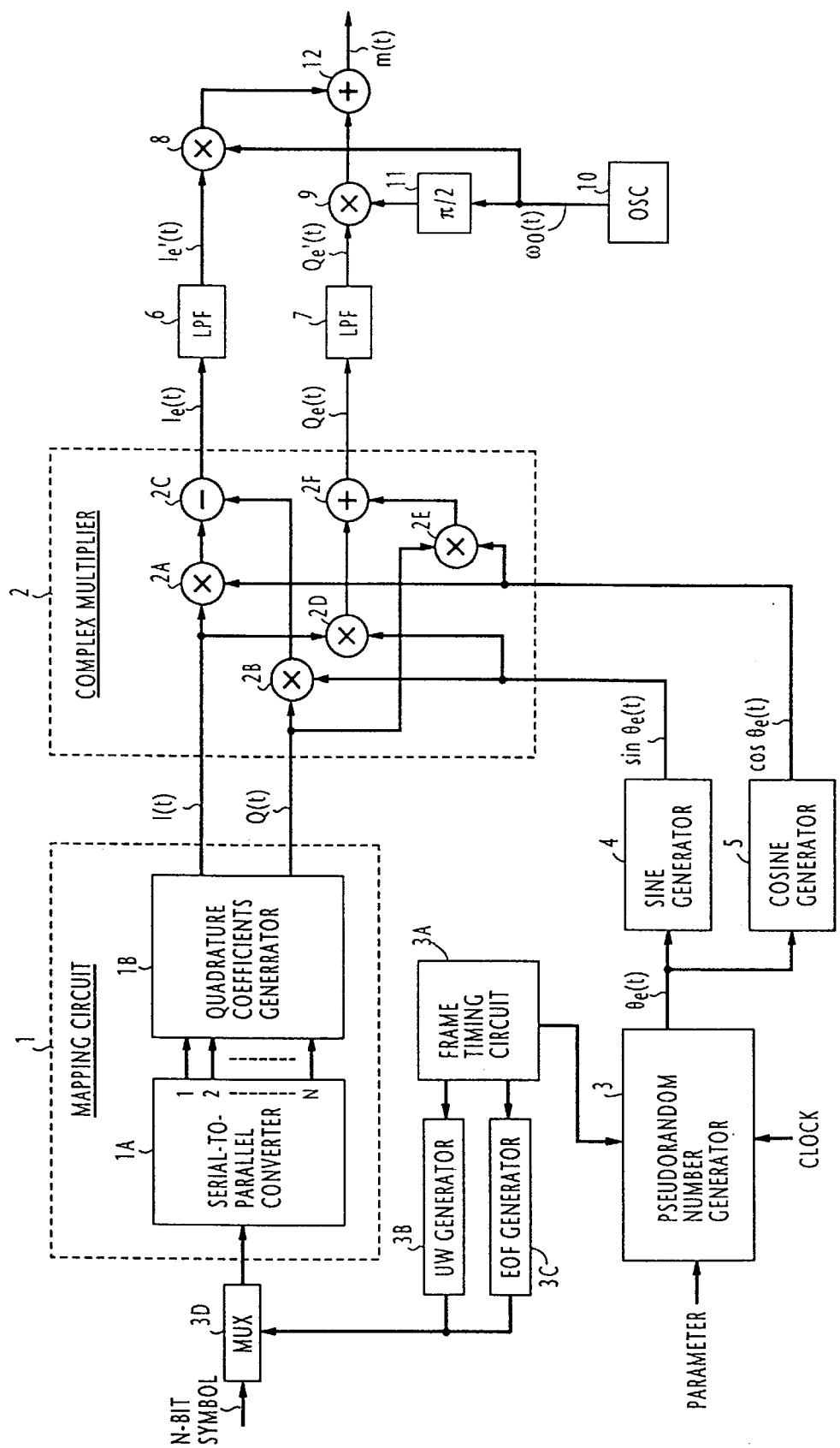
FIG. 1 is a block diagram of an encryption PSK transmitter for a secure communication system according to the present invention.

Referring now to FIG. 1, there is shown a PSK (phase shift keying) transmitter of the present invention for secure communication. In the PSK transmitter, a sequence of N-bit input symbols are entered to a mapping circuit 1 wherein the N bits of each symbol are stored in a serial-to-parallel converter 1A and presented in parallel to N output lines of the converter, where N is an integer equal to or greater than one. The converter outputs remain unchanged for the duration of the symbol during which time the converter is assembling the next symbol of N bits. The converter outputs are applied to a quadrature coefficients generator 1B. This coefficients generator produces, for each N-bit symbol, a pair of vectors $I(t) = \cos(2n\pi + k)/2^N$ and $Q(t) = \sin(2n\pi + k)/2^N$, where $n = 0, 1, 2, \ldots, 2^N - 1$ corresponding respectively to the value of the symbol and $k = 0$ or 1. Each N-bit symbol is therefore mapped to a pair of in-phase and quadrature coefficients, forming a vector on a two-dimensional plane known as phasor diagram. If 4-PSK signaling is employed and $k = 1$, N is 2 and $n = 0, 1, 2$ and 3 so that their possible phase angles are $\pi/4$, $3\pi/4$, $5\pi/4$ and $7\pi/4$ radians (for $k = 0$, $2n\pi/2^N = 0$, $\pi/2$, $\pi$ or $3\pi/2$). In conventional PSK modulation, the k-value is usually set to 1 since it simplifies implementations. However, in the present invention, due to the encryption process which will be described hereinbelow the quadrature coefficients $I(t)$ and $Q(t)$ will be encrypted so that they vary pseudo-randomly, and hence, the k-value has no practical significance for implementation.

For purposes of illustration, the following description will proceed using 4-PSK modulation as a simplified example.

Figure 3:
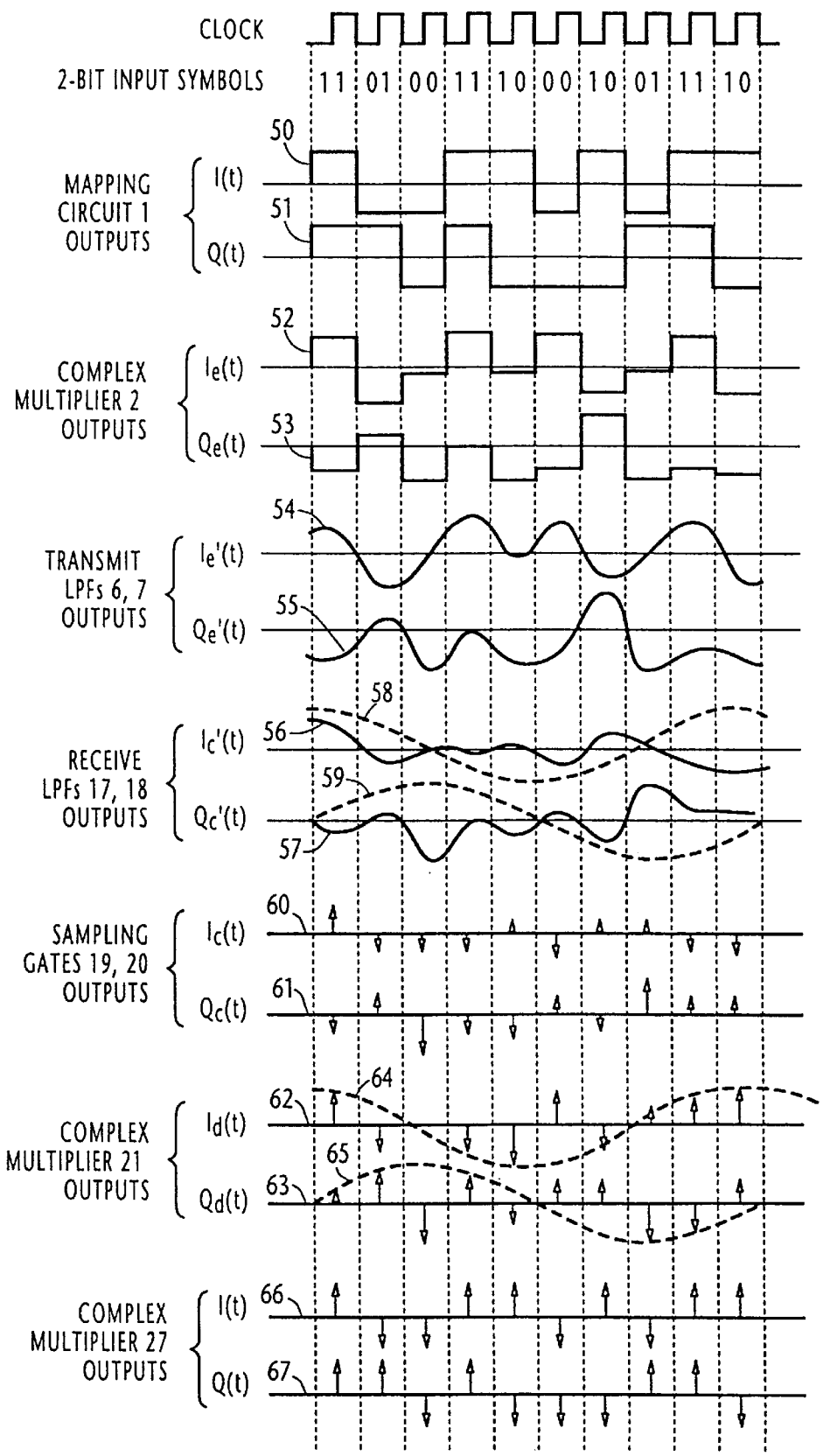
FIG. 3 is a timing diagram illustrating various waveforms appearing in the secure system of the present invention.

In response to a sequence of 2-bit symbols as shown in FIG. 3, the mapping circuit 1 produces $I(t)$ and $Q(t)$ quadrature coefficients outputs with amplitudes varying at one of two discrete values +1 and −1, as indicated by numerals 50 and 51. The outputs of mapping circuit 1 are applied to complex multiplier 2 where they are multiplied by sinusoidal waveforms for purposes of encryption.

To achieve the encryption, a pseudorandom number (PN) generator 3, a sine generator 4 and a cosine generator 5 are provided. In response to an encryption clock pulse, the PN generator 3 produces a pseudorandom number $\theta_e(t)$ which varies in a range between 0 and $2\pi$ radians. Preferably, the encryption clock rate is equal to or lower than the symbol rate to prevent the encrypted PSK signal from being distributed over a wide range of frequency spectrum. The pattern of pseudorandom values is unique for each secure communication system and this uniqueness is determined by an input parameter, or encryption key. As is well known, the PN generator consists of shift register driven by the encryption clock and a number of exclusive-OR gates coupled to several stages of the shift register to produce cyclic pseudorandom sequences of "0"s and "1"s occurring with equal probability. The number of the exclusive-OR gates and the stages of the shift register to which they are connected are determined by the encryption key.

The output of PN generator 3 is applied to the sine generator 4 and cosine generator 5 where the pseudo-random angular data $\theta_e(t)$ is converted to sinusoidal waveforms $\sin \theta_e(t)$ and $\cos \theta_e(t)$, respectively.

In the complex multiplier 2, the in-phase component I(t) is multiplied by the output of cosine generator 5 in a multiplier 2A and the quadrature component Q(t) is multiplied by the output of sine generator 4 in a multiplier 2B. The outputs of multipliers 2A and 2B are coupled to a subtractor 3C to produce an encrypted in-phase signal $I_e(t)$. Additionally, the in-phase component vector I(t) is multiplied by the output of sine generator 4 in a multiplier 2D and the quadrature component vector Q(t) is multiplied by the output of cosine generator 5 in a multiplier 2E. The outputs of multipliers 2D and 2E are coupled to an adder 2F to produce an encrypted quadrature signal $Q_e(t)$. The encrypted in-phase and quadrature signals $I_e(t)$ and $Q_e(t)$ are given by the following relations:

$$I_e(t)=I(t)\cos \theta_e(t)-Q(t)\sin \theta_e(t) \quad (1a)$$

$$Q_e(t)=I(t)\sin \theta_e(t)+Q(t)\cos \theta_e(t) \quad (1b)$$

Since the encrypted signals $I_e(t)$ and $Q_e(t)$ are real and imaginary numbers, respectively, Equations (1a) and (1b) can be rewritten in the complex form as:

$$I_e(t)+jQ_e(t)=[I(t)+jQ(t)]e^{j\theta_e(t)} \quad (1')$$

As indicated by numerals 52 and 53 in FIG. 3, the encrypted signals $I_e(t)$ and $Q_e(t)$ vary at pseudorandomly determined levels in the range between +1 and −1. From Equation (1') it is seen that the complex multiplier 2, sine generator 4 and cosine generator 5 constitute a phase rotation circuit where the output vector of mapping circuit 1 is pseudorandomly phase-rotated in a given direction by an amount corresponding to the pseudorandom number produced by the PN generator 3.

To permit the receiver of the system to synchronize to transmitted symbols, a frame timing circuit 3A is provided at the transmitter for supplying a timing signal at the beginning of a frame to a unique word generator 3B to produce a predetermined sequence of symbols, or unique word. This unique word is multiplexed with transmit data symbols in a multiplexer 3D and transmitted just prior to data symbols. The pseudorandom sequence generator 3 is triggered by the frame timing circuit 3A each time a unique word is transmitted. When the unique word is being transmitted, the PN generator 3 is set in an initial state in which it causes the sine and cosine generators 4 and 5 to produce predetermined values so that the complex multiplier 2 operates as if it were a simple gate circuit for coupling the outputs of mapping circuit 1 direct to the lowpass filters 6 and 7, and hence the modulation format is the same as conventional PSK format during the transmission of the unique word. Frame timing circuit 3A further supplies a timing signal at the end of each frame to an end-of-frame flag generator 3C to produce a flag sequence which is multiplexed with the transmitted symbols at the end of each frame. When the end-of-flag sequence is transmitted, the frame timing circuit 3A sets the PN generator 3 to the initial state.

For band-limiting the encrypted signals, the outputs of the complex multiplier 2 are lowpass-filtered by LPFs 6 and 7, respectively, producing signals $I_e'(t)$ and $Q_e'(t)$ as illustrated by typical waveforms 54 and 55 in FIG. 3. Preferably, lowpass filters 6 and 7 are implemented in a matched filter configuration. The output of the lowpass filter 6 is multiplied in a multiplier 8 by an in-phase carrier of angular frequency $\omega_0 t$ supplied from an oscillator 10, producing an amplitude-modulated in-phase signal. The output of lowpass filter 7 is multiplied in a multiplier 9 by a quadrature carrier supplied from oscillator 10 via a phase shifter 11, producing an amplitude-modulated quadrature signal. These amplitude-modulated signals are summed in an adder 12 to produce a constant-envelope phase-shift keyed signal m(t) for transmission. The encrypted PSK signal is thus expressed by:

$$m(t)=I_e'(t)\cos \omega_0 t+Q_e'(t)\sin \omega_0 t \quad (2)$$

In conventional 4-PSK transmitters, each 2-bit symbol is assigned to a set of known quadrature coefficients. In contrast, each 2-bit symbol in the 4-PSK transmitter of the present invention is assigned to a set of quadrature coefficients which are only known to the system user.

Figure 2:
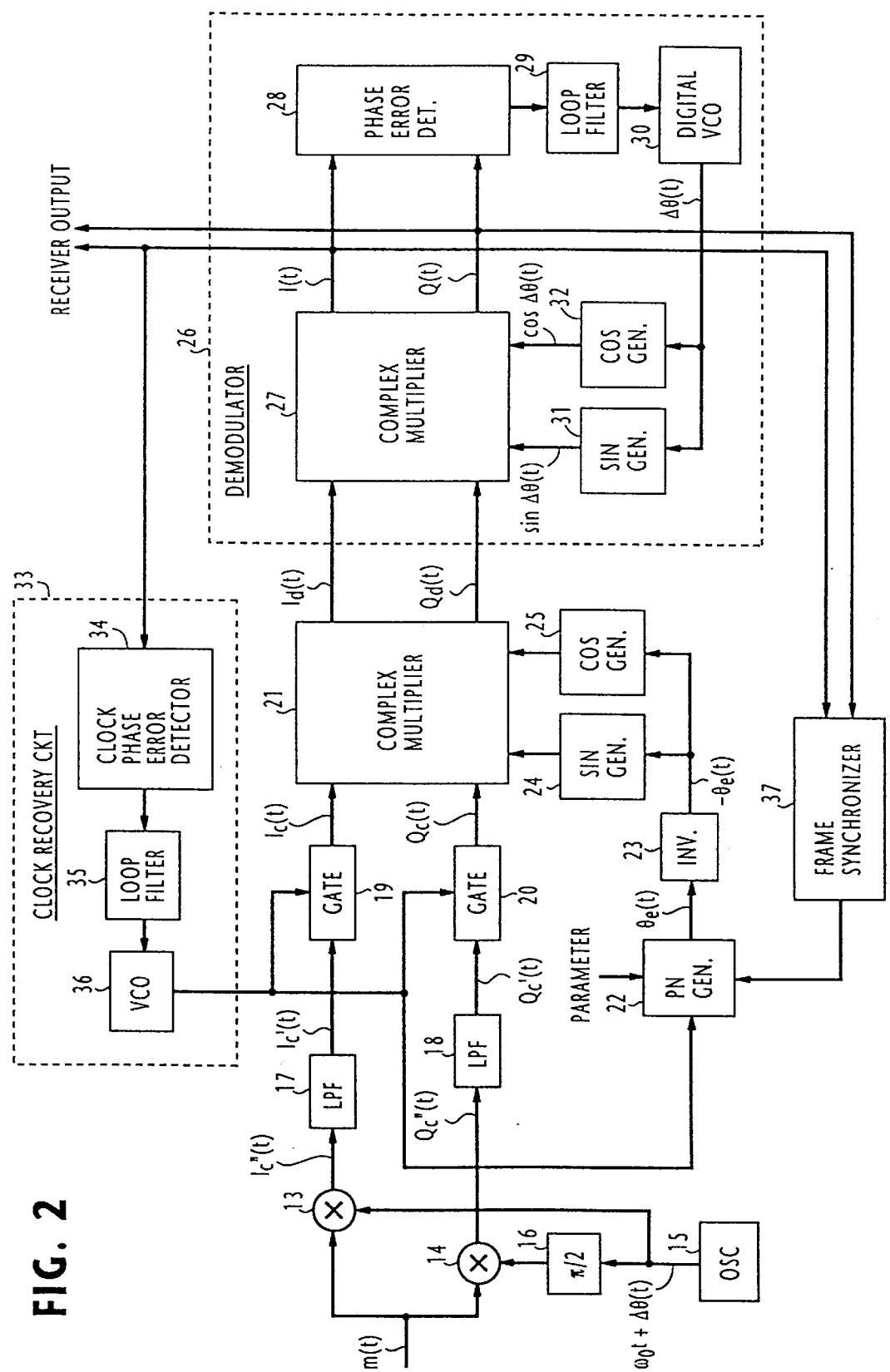
FIG. 2 is a block diagram of a decryption PSK receiver of the present invention.

A PSK receiver of the present invention for deciphering the transmitted PSK signal is shown in FIG. 2. The receiver includes a pair of multipliers 13 and 14 where the transmitted PSK signal is received and multiplied by an in-phase carrier from a local oscillator 15 and a quadrature carrier from the oscillator via a $\pi/2$ phase shifter 16, detecting an in-phase signal $I_c''(t)$ and a quadrature signal $Q_c''(t)$. The local carrier has the same frequencey as the transmitted carrier. However, the local carrier is not precisely synchronized to the phase of the transmitted carrier. Therefore, the angular frequency of the local carrier is represented as $\omega_0 t+\Delta\theta(t)$, where $\Delta\theta(t)$ is the time-varying phase deviation from the phase timing of the transmitted carrier, and hence the detection process is called "quasi-synchronous detection". The outputs of multipliers, or quasi-synchronous detectors 13 and 14 are given as follows:

$$\begin{aligned} I_C''(t) &= m(t)\cos[\omega_0 t + \Delta\theta t] \\ &= \frac{I_C'(t)}{2}\{\cos\Delta\theta(t) + \cos[2\omega_0 t + \Delta\theta(t)]\} + \\ &\quad \frac{Q_C'(t)}{2}\{-\sin\Delta\theta(t) + \sin[2\omega_0 t + \Delta\theta(t)]\} \end{aligned} \quad (3a)$$

$$\begin{aligned} Q_C''(t) &= m(t)\sin[\omega_0 t + \Delta\theta(t)] \\ &= \frac{I_C'(t)}{2}\{-\sin\Delta\theta(t) + \sin[2\omega_0 t + \Delta\theta(t)]\} + \\ &\quad \frac{Q_e'(t)}{2}\{\cos\Delta\theta(t) - \cos[2\omega_0 t + \Delta\theta(t)]\} \end{aligned} \quad (3b)$$

The outputs of multipliers 13 and 14 are applied to lowpass filters (preferably, matched filters) 17 and 18, respectively, where their higher frequency components are removed to produce lowpass-filtered signals $I_c'(t)$ and $Q_c'(t)$, as illustrated by typical waveforms 56 and 57 in FIG. 3. Since the local oscillator 15 has a phase deviation $\Delta\theta(t)$ with respect to the transmitted clock, as described above, the phase deviation causes phase rotations which would appear as low frequency carrier components as indicated by dotted waveforms 58 and 59 in FIG. 3. Thw lowpass-filtered signals are supplied to sampling gates 19 and 20. If the lowpass-filtered signals are sampled at timing synchronized to the clock timing of the transmitted signal, their intersymbol interference can be removed, producing sampled signals $I_c(t)$ and $Q_c(t)$, as shown at 60 and 61 in FIG. 3, which are represented by the following Equations:

$$I_c(t)=\tfrac{1}{2}[I_e(t)\cos \Delta\theta(t)-Q_e(t)\sin \Delta\theta(t)] \quad (4a)$$

$$Q_c(t)=\tfrac{1}{2}[I_e(t)\sin \Delta\theta(t)+Q_e(t)\cos \Delta\theta(t)] \quad (4)$$

or alternatively, in the complex form:

$$I_c(t)+jQ_c(t)=I_c(t)=\tfrac{1}{2}[I_e(t)+jQ_e(t)]e^{j\Delta\theta(t)} \quad (4')$$

Since the $I_e(t)$ and $Q_e(t)$ correspond to the output signals of the complex multiplier 2 and the transmitter, Equation (4') is rewritten as follows by substituting Equation (1') into Equation (4'):

$$I_c(t)+jQ_c(t)=\tfrac{1}{2}[I(t)+jQ(t)]e^{[\theta e(t)+\Delta\theta(t)]} \quad (5)$$

The outputs of sampling gates 19 and 20 are then fed into a complex multiplier 21 where they are deciphered by a complex-multiplication process similar to that of the complex multiplier 2 at the transmitter, using a set of sine and cosine sinusoidal waveforms. A pseudorandom number generator 22 produces the same PN sequence data $\theta_e(t)$ as that of the PN generator 3 at the transmitter using a decryption key parameter which is the same as the encryption key parameter. This PN sequence is inverted by an inverter 23 and applied to sine and cosine generators 24 and 25 of identical construction to the transmitter's sine and cosine generators 4 and 5.

In the complex multiplier 21, the outputs $I_c(t)$ and $Q_c(t)$ of sampling gates 19, 20 are complex-multiplied by sinusoidal waveforms $-\sin\theta_e(t)$ and $\cos\theta_e(t)$ supplied from sine and cosine generators 24 and 25. Therefore, the complex multiplier 21, inverter 23, sine generator 24 and cosine generator 25 constitute a phase rotation circuit where the output vector of sampling gates 19, 20 is pseudorandomly phase-rotated in a direction opposite to the direction of rotation at the transmitter by an amount corresponding to the pseudorandom number produced by the PN generator 22, producing deciphered signals $I_d(t)$ and $Q_d(t)$. As typically shown in the form of pulse trains 62 and 63 in FIG. 3, these deciphered signals are represented by the following Equations:

$$I_d(t)=\tfrac{1}{2}[I_c(t)\cos\theta_e(t)+Q_c(t)\sin\theta_e(t)] \quad (6a)$$

$$Q_d(t)=\tfrac{1}{2}[-I_c(t)\sin\theta_e(t)+Q_c(t)\cos\theta_3(t)] \quad (6b)$$

Because of the phase error of the local oscillator 15, it can be said that the deciphered signals $I_d(t)$ and $Q_d(t)$ have been modulated in amplitude and polarity as indicated by waveforms 64 and 65. Since these signals are real and imaginary numbers, respectively, Equations (6a) and (6b) can be rewritten in the complex form:

$$I_d(t)+jQ_d(t)=[I_c(t)+jQ_c(t)]e^{-j\theta e(t)} \quad (6')$$

Substituting Equation (5) into Equation (6') yields the following relation:

$$I_d(t)+jQ_d(t)=[I(t)+jQ(t)]e^{j\Delta\theta(t)} \quad (7)$$

From Equation (7) it is seen that the output signals $I_d(t)$ and $Q_d(t)$ of complex multiplier 21 no longer contain the pseudorandom components $\theta_e(t)$ introduced at the transmitter. As a result, $I_d(t)$ and $Q_d(t)$ are identical to conventional quasi-synchronously detected, non-encrypted signals containing errors due to phase rotation caused by the phase error $\Delta\theta(t)$ of local oscillator 15. If the encrypted PSK signal is received by a receiver having no knowledge of the deciphering key parameter, the outputs of the complex multiplier 21 of the receiver would be represented by the following:

$$\begin{aligned}I_d(t)+jQ_d(t) &= 2[I_C(t)+jQ_C(t)]e^{-j\theta e'(t)} \\ &= [I(t)+jQ(t)]e^{j[\theta Qe(t)-\theta e'(t)+\Delta\theta(t)]}\end{aligned} \quad (6'')$$

Thus, the attempt to decipher the encrypted PSK signal will result in a failure.

The outputs of complex multiplier 21 are applied to a demodulator 26 for detecting the phase error $\Delta\theta(t)$ of the local oscillator 15 to use it for recovering the transmitted baseband signals I(t) and Q(t), and producing the clock pulse for the sampling gates 19 and 20 in synchronism to the transmitted clock.

To provide these functions, demodulator 26 comprises a complex multiplier 27 for receiving the output signals $I_d(t)$ and $Q_d(t)$ from complex multiplier 21 to recover the original vector data I(t) and Q(t) as an output of the receiver to external utilization circuitry, not shown, as well as to a phase error detector 28 whose output is coupled through a loop filter 29 to a digital voltage-controlled oscillator 30 which includes a numeric-controlled oscillator to produce an output signal representative of the phase error $\Delta\theta(t)$ of the local oscillator 15. The output of VCO 30 is used by sine generator 31 and a cosine generator 32 to produce sinusoidal waveforms $\sin\Delta\theta(t)$ and $\cos\Delta\theta(t)$. The outputs of sine and cosine generators 31, 32 are supplied to complex multiplier 27 where they are complex-multiplied with $I_d(t)$ and $Q_d(t)$. Phase error detector 30 uses the outputs of complex multiplier 27 to determine the phase difference between the output phase of complex multiplier 27 and the output phase of the VCO 30 and controls it through loop filter 29 so that the detected phase difference reduces to zero. When this occurs, the output VCO 30 is matched to the local oscillator's phase error $\Delta\theta(t)$, and the following computations proceed in the complex multiplier 27, yielding output signals I(t) and Q(t).

$$I_d(t)\cos\Delta\theta(t)-Q_d(t)\sin\Delta\theta(t)=I(t) \quad (8a)$$

$$I_d(t)\sin\Delta\theta(t)+Q_d(t)\cos\Delta\theta(t)=Q(t) \quad (8b)$$

In the complex-number notation, Equations (8a) and (8b) are given by:

$$\begin{aligned}I_d(t)+jQ_d(t) &= [I(t)+jQ(t)]e^{j[\Delta\theta(t)-j\Delta\theta(t)]} \\ &= I(t)+jQ(t)\end{aligned} \quad (9)$$

It is seen that the outputs of the complex multiplier 27 are identical in amplitude to the outputs of the transmitter's mapping circuit 1, as shown at 66 and 67 in FIG. 3. The original symbol sequence can be obtained from the outputs of complex multiplier 27 by the use of a parallel-to-serial converter, not shown.

The outputs of complex multiplier 27 are further supplied to a clock phase error detector 34 which forms part of a clock recovery circuit 33. Phase error detector 34 estimates the phase error of the clock pulse supplied to sampling gates 19, 20 with respect to the clock timing of the transmitted N-bit symbol. Details of this circuit are described in a paper "Development of Variable-Rate Digital Modem for Digital Satellite Communications Systems", Susumu Otani et al (CH2535-3/88/0000-0418, 19887, IEEE). The output of clock phase error detector 34 is coupled via a loop filter 35 to a voltage-controlled oscillator 36, which supplies the clock pulse to sampling gates 19 and 20 synchronously to the clock timing of the transmitted signal. The output of the VCO 36 is further used to clock the PN generator 22.

A frame synchronizer 37 is provided for synchronizing the start timing of PN generator 22 to the start timing of the encryption PN sequence at the transmitter. Frame synchronizer 37 is connected to the outputs of the complex multiplier 27 to detect a unique word transmitted at the beginning of each frame and triggers the PN generator 22 to start generating the predetermined PN sequences. Frame synchronizer 37 further detects an end-of-frame flag sequence at the end of each frame to set the PN generator 22 to an initial state. In this initial state, PN generator 22 causes sine and cosine generators 24 and 25 to supply predetermined values to the complex multiplier 21 so that the latter operates as if it were a simple gate circuit for the incoming signals.

If an attempt is made to decipher the signal encrypted in a manner as taught by the present invention, using quasi-synchronous detection, it would be necessary to estimate not only the pseudorandomness of the pattern with which the mapped signals are encrypted but also the number of phase angles (i.e., $2^N$) into which the original symbol is encoded. Furthermore, the anti-eavesdropping feature of the present invention is particularly effective against a possible attempt where a Costas-loop demodulator is used. In such instances, no carrier recovery could be recovered at all. Since the carrier recovery feature is essential to this type of demodulator, such an eavesdropping attempt would result in a total failure.

What is claimed is:

1. A secure communication system comprising:
   a mapping circuit for mapping an N-bit symbol to a corresponding one of a predetermined number of vectors in a two-dimensional phase plane, where N is an integer equal to or greater than one;
   a first pseudorandom number generator for producing a first pseudorandom number varying in a range between 0 and $2\pi$ radian;
   means for producing a first sine-wave and a first cosine-wave in accordance with said first pseudorandom number;
   a first complex multiplier for complex, multiplying an output vector of said mapping circuit by the first sine-wave and the first cosine-wave;
   a first lowpass filter circuit for lowpass-filtering an output vector of said first complex multiplier;
   a first oscillator for producing a carrier;
   a quadrature modulator for quadrature-modulating said carrier with the lowpass-filtered vector for transmission;
   a second oscillator for producing a local carrier having a same frequency as the quadrature-modulated carrier;
   a quadrature detector for receiving the quadrature-modulated carrier and quasi-synchronously quadrature-detecting the received carrier with said local carrier;
   a second lowpass filter circuit for lowpass-filtering an output vector of said quadrature detector;
   a sampling circuit for sampling the lowpass-filtered output vector in response to a sampling pulse;
   a second pseudorandom number generator for producing a second pseudorandom number varying in a range between 0 and $2\pi$ radian, said second pseudorandom number being identical in magnitude to, but opposite in sign to said first pseudorandom number;
   means for producing a second sine-wave and a second cosine-wave in accordance with said second pseudorandom number;
   a second complex multiplier for complex-multiplying an output vector of said sampling circuit by the second sine-wave and the second cosine-wave;
   a quadrature demodulator for detecting a phase error of said local carrier with respect to the quadrature-modulated carrier and quadrature-demodulating an output vector of said second complex multiplier with the detected phase error; and
   means for estimating a phase error of an output vector of said quadrature demodulator with respect to said N-bit symbol and producing therefrom a timing signal and applying the timing signal to said sampling circuit as said sampling pulse.

2. A phase shift keying (PSK) transmitter comprising:
   a mapping circuit for mapping an N-bit symbol to a corresponding one of a predetermined number of vectors in a two-dimensional phase plane, where N is an integer equal to or greater than one;
   a pseudorandom number generator for producing a pseudorandom number varying in a range between 0 and $2\pi$ radian;
   means for producing a sine-wave and a cosine-wave in accordance with said first pseudorandom number;
   a complex multiplier for complex-multiplying an output vector of said mapping circuit by the sine-wave and the cosine-wave;
   a lowpass filter circuit for lowpass-filtering an output vector of said complex multiplier;
   an oscillator for producing a carrier; and
   a quadrature modulator for quadrature-modulating said carrier with the lowpass-filtered vector for transmission.

3. A phase shift keying (PSK) receiver for receiving a quadrature-modulated PSK carrier containing a N-bit symbol vector which has been phase-rotated in a first direction in accordance with a first pseudorandom number varying in a range between 0 and $2\pi$ radian, where N is an integer equal to or greater than one, comprising:
   a local oscillator for producing a local carrier having a same frequency as the quadrature-modulated PSK carrier;
   a quadrature detector for receiving the quadrature-modulated carrier and quasi-synchronously quadrature-detecting the received carrier with said local carrier;
   a lowpass filter circuit for lowpass-filtering an output vector of said quadrature detector;
   a sampling circuit for sampling the lowpass-filtered output vector in response to a sampling pulse;
   a pseudorandom number generator for producing a second pseudorandom number varying in a range between 0 and $2\pi$ radian, said second pseudorandom number being identical in magnitude to but opposite in sign to said first pseudorandom number;
   means for producing a sine-wave and a cosine-wave in accordance with said second pseudorandom number;
   a complex multiplier for complex-multiplying an output vector of said sampling circuit by the sine-wave and the cosine-wave;
   a quadrature demodulator for detecting a phase error of said local carrier with respect to the quadrature-modulated PSK carrier and quadrature-demodulating an output vector of said complex multiplier with the detected phase error; and
   means for estimating a phase error of an output vector of said quadrature demodulator with respect to said N-bit symbol vector and producing therefrom a timing signal and applying the timing signal to said sampling circuit as said sampling pulse.

4. A method for securing privacy of communication, comprising the steps of:
 a) mapping an N-bit symbol to a corresponding one of a predetermined number of vectors in a two-dimensional phase plane, where N is an integer equal to or greater than one;
 b) producing a first pseudorandom number varying in a range between 0 and $2\pi$ radian;
 c) producing a first sine-wave and a first cosine-wave in accordance with said first pseudorandom number;
 d) complex-multiplying the vector mapped by step (a) by the first sine-wave and the first cosine-wave;
 e) lowpass-filtering the vector complex-multiplied by step (d);
 f) quadrature-modulating a carrier with the lowpass-filtered vector;
 g) transmitting the quadrature-modulated carrier;
 h) receiving the quadrature-modulated carrier and quasi-synchronously quadrature-detecting the received carrier with a local carrier to produce a quadrature-detected vector;
 i) lowpass-filtering the quadrature-detected vector;
 j) sampling the lowpass-filtered vector in response to a sampling pulse;
 k) producing a second pseudorandom number varying in a range between 0 and $2\pi$ radian, said second pseudorandom number being identical in magnitude to, but opposite in sign to said first pseudorandom number;
 l) producing a second sine-wave and a second cosine-wave in accordance with said second pseudorandom number;
 m) complex-multiplying the vector sampled by step (j) by the second sine-wave and the second cosine-wave;
 n) detecting a phase error of said local carrier with respect to the quadrature-modulated carrier and quadrature-demodulating the vector complex-multiplied by step (m) with the detected phase error; and
 o) estimating a phase error of the quadrature-demodulated vector with respect to said N-bit symbol and producing therefrom the sampling pulse of step (j).

* * * * *

UNITED STATES PATENT AND TRADEMARK OFFICE
CERTIFICATE OF CORRECTION

PATENT NO. : 5,838,797
DATED : November 17, 1998
INVENTOR(S) : Motoya IWASAKI

It is certified that error appears in the above-indentified patent and that said Letters Patent is hereby corrected as shown below:

Column 4, eq. (3b) delete "$Q_c"(t)$" and insert -- $Q_c("t)$--;

Column 4, eq. (3b) delete "-" before "sin $\Delta\theta(t)$";

Column 4, line 53, delete "Thw" and insert --The--;

Column 4, eq. 4a-4, delete "(4)" and insert --(4b) and replace "$\Delta 0t$" with --$\Delta\theta t$--

Column 5, eq. (5), delete entire equation and insert
--$I_c(t) + kQ_c(t) = \frac{1}{2}[I(t)+jQ(t)]e^{j[\theta_e(t)+\Delta\theta(t)]}$--;

Column 5, eq. (6b) replace "$0_3(t)$" with --$\theta_e(t)$-- (1 occurrence);

Column 7, line 38, delete "complex, multiplying" and insert --complex-multiplying--.

Signed and Sealed this

Twenty-sixth Day of October, 1999

*Attest:*

Q. TODD DICKINSON

*Attesting Officer*   *Acting Commissioner of Patents and Trademarks*